United States Patent [19]

Naritomi et al.

[11] Patent Number: 5,002,625

[45] Date of Patent: Mar. 26, 1991

[54] PROCESS FOR PRODUCING COMPOSITE MOLDED PRODUCT

[75] Inventors: Masanori Naritomi, Uryasu; Noritaka Ogawa, Tokyo, both of Japan

[73] Assignee: Taisei Purasu Co., Ltd., Japan

[21] Appl. No.: 421,541

[22] Filed: Oct. 13, 1989

[51] Int. Cl.$^5$ .............................................. B29C 47/00
[52] U.S. Cl. .................................. 156/245; 156/308.2; 156/309.6; 264/259; 428/217; 525/88
[58] Field of Search .................. 156/308.2, 309.6, 245; 264/259; 428/217; 525/88

[56] References Cited

U.S. PATENT DOCUMENTS 4,066,269  1/1978  Linne .................................. 428/217

Primary Examiner—John J. Gallagher
Attorney, Agent, or Firm—Jordan B. Bierman; Bierman and Muserlian

[57] ABSTRACT

A process for producing a composite molded product by fusion-bonding a thermoplastic elastomer composition to a molded piece which has previously been formed from a synthetic resin material and which has a higher hardness (JIS Shore hardness: A scale) than that of a molded piece formed from the thermoplastic elastomer composition, or by fusion-bonding a synthetic resin material to a molded piece which has previously been formed from a thermoplastic elastomer composition and which has a lower hardness than that of a molded piece formed from the synthetic resin material. The thermoplastic elastomer composition comprises 100 parts by weight of a thermoplastic elastomer and 25 to 185 parts by weight of a polyether block amide.

6 Claims, No Drawings

PROCESS FOR PRODUCING COMPOSITE MOLDED PRODUCT

BACKGROUND OF THE INVENTION

1. Field of the Invention

The present invention relates to a novel process for producing a composite molded product comprising a rigid part and a soft part. More particularly, the present invention pertains to a process for producing a composite molded product efficiently by a fusion bonding means, the product having a part made of an engineering plastic material which is rigid and superior in various properties, for example, a polycarbonate, and a part made of a soft thermoplastic elastomer.

2. Description of the Prior Art

Engineering plastics, which have excellent mechanical strength, are employed to produce mechanical parts or structural parts which are used under load. Various kinds of engineering thermoplastics are known, namely, polyamides, polyacetals, polycarbonates, modified polyphenylene oxides, polybutylene terephthalate, polysulfone, total aromatic polyester, etc.

In the meantime molded articles formed from thermoplastic elastomers (TPE) are also produced by injection molding technique which gives particularly high productivity and used in a variety of applications. Examples of known thermoplastic elastomers of this type include styrene-butadiene elastomers, polyolefin elastomers, polyurethane elastomers, vinyl chloride elastomers and acrylic ester elastomers.

The injection molding process is capable of effectively forming molded articles having complex shapes and suitable for mass-production, and it is applied to the abovementioned engineering plastics to efficiently produce various kinds of mechanical and structural parts.

There have recently been strong demands for increases in the level of performance and function of parts and members made of synthetic resin (plastic) materials. Under these circumstances, attempts have been made to combine together engineering plastics and thermoplastic elastomers, such as those mentioned above, to thereby form composite products. For this purpose, it is the most effective process to fusion-bond together these two different kinds of material into composite products by the injection molding technique that is a molding means common to the two different kinds of material.

However, the fusion bond properties of thermoplastic engineering plastics with respect to thermoplastic resins are, generally, not always good. The fusion bond properties with respect to thermoplastic elastomers (TPE) having high rubber elasticity are particularly inferior, so that these two materials cannot rigidly be bonded together. For this reason, when thermoplastic engineering plastics and thermoplastic elastomers (TPE) are to be combined together to produce composite products of high added value, e.g., composite parts and composite members, it is general practice to adopt a method wherein locking portions, for example, a combination of a recess and a projection, are provided at the joint of the two different kinds of material to thereby bond them together mechanically, or a method wherein an adhesive is applied to the joint of the two materials to bond them together.

The above-described conventional technique of forming a composite product from a thermoplastic engineering plastic and a thermoplastic elastomer (TPE) suffers, however, from the problems that the process is inefficient and the strength and sealing at the bond area are unsatisfactory.

More specifically, the method in which the two different kinds of material are mechanically bonded together through locking portions, for example, a combination of a recess and a projection, has the problems that the structure of the mold employed is complicated and the number of steps required for the process increases depending upon the structure. In view of the final shape of the composite molded product, it may be impossible to attain a strong composite structure. In addition, the mechanical bonding is incapable of attaining satisfactory waterproofness in the case of a composite molded product that is required to be waterproof, for example, water goggles in which the body portion is made of a rigid engineering plastic material and the edge portions that come into contact with the user's face are made of a soft and high-elasticity thermoplastic elastomer.

The method that uses an adhesive requires additional steps, for example, application of an adhesive, and suffers from the problem that the bond strength is low due to deterioration with time of the adhesive.

SUMMARY OF THE INVENTION

In view of the above-described circumstances, it is an object of the present invention to provide a novel process for producing a composite molded product, that is, a molded product formed by strongly bonding together a part made of a synthetic resin material such as an engineering plastic material and a part made of a thermoplastic elastomer having high rubber elasticity.

It is another object of the present invention to provide novel functional parts and high value-added parts: e.g., water goggles or other similar products (members) which are required to have high strength and waterproof performance, plastic telephone receivers, handles (grips) or other similar products in which the grip portion is made of a thermoplastic elastomer so as to be soft, plastic headlight covers for automobiles or other similar products in which a thermoplastic elastomer is attached to the edge portion of the cover as an integral portion thereof so as to serve as a packing member when the cover is installed, air shielding packings, valve parts, power transmitting parts such as flexible couplings and gears, etc.

To these ends, the present invention provides a process for producing a composite molded product by fusion-bonding a thermoplastic elastomer composition to a molded piece which has previously been formed from a synthetic resin material and which has a higher hardness (JIS Shore hardness: A scale) than that of a molded piece formed from said thermoplastic elastomer composition, or by fusion-bonding a synthetic resin material to a molded piece which has previously been formed from a thermoplastic elastomer composition and which has a lower hardness than that of a molded piece formed from said synthetic resin material, wherein said thermoplastic elastomer composition comprises:
(i) 100 parts by weight of a thermoplastic elastomer; and
(ii) 25 to 185 parts by weight of a polyether block amide.

DETAILED DESCRIPTION OF THE INVENTION

The structure of the present invention will be described below in detail.

The present invention resulted from the thorough investigation conducted to find a method of efficiently producing a composite product by joining a thermoplastic elastomer which is soft and has high rubber elasticity to a molded piece which has previously been formed from a synthetic resin material, for example, a polycarbonate, and which has a higher hardness (JIS Shore hardness: A scale) than that of a molded piece formed from said thermoplastic elastomer.

When a thermoplastic elastomer of high elasticity is merely fusion-bonded to a molded piece which has previously been formed from a synthetic resin material having a relatively high hardness by means, for example, of injection molding process, the bond strength of the resulting composite product is extremely low and thus unsatisfactory.

The most significant feature of the present invention resides in the use of a polyether block amide of the general formula (1) below in order to improve the strength of the bond between a molded piece formed from a synthetic resin material having a relatively high hardness and a high-elasticity and soft thermoplastic elastomer by means of fusion bonding:

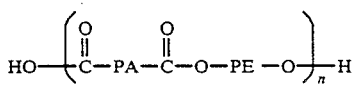

(1)

wherein
PA: the block of a polyamide constituting a hard segment
PE: the block of a polyether constituting a soft segment It is not clear why a part consisting of a molded piece formed from a synthetic resin material having relatively high hardness and a part consisting of a molded piece formed from a high-elasticity and soft thermoplastic elastomer are strongly bonded together through fusion bonding by the use of a polyether block amide of the formula (1). It is, however, believed that the high bond strength is obtained as the result of the hard segment (PA), soft segment (PE) and functional groups such as OH and COOH of the polyether block amide effectively interacting with each other at the fusion bond area between the molded parts that are respectively formed from the two different kinds of material.

The polyether block amide per se of the formula (1) that is used in the present invention is a known substance, as is disclosed, for example, in the specification of U.S. Pat. Nos. 4,230,838 and 4,332,920. The polyether block amide is, for example, prepared by polycondensation of the following components:
(a) a diamine and dicarboxylate (polyamide), a lactam, or an amino carboxylic acid (PA component);
(b) a polyoxyalkylene glycol such a polyoxyethylene glycol or polyoxypropylene glycol (PE component); and
(c) a dicarboxylic acid.

There are commercially available polyether block amides, for example, PEBAX 6333 SA00 (manufactured by Toray Industries, Inc.).

The polyether block amide of the formula (1) is used in an amount of 25 to 185 parts by weight per 100 parts by weight of a thermoplastic elastomer in order to ensure the satisfactorily high bond strength. More preferably, 40 to 60 parts by weight of the polyether block amide and 100 parts by weight of a thermoplastic elastomer are uniformly blended together by mechanical means to form a blend in which the two components are insularly dispersed.

In the present invention, it is possible to use any thermoplastic elastomer which provides a molded part having a lower hardness than that of a molded part which is formed from a synthetic resin material described later. Examples of such thermoplastic elastomers include a hydrogenated SBS block copolymer, an olefin elastomer such as EPR, a diene elastomer such as SBR, an urethane elastomer and a plasticized polyvinyl chloride of high elasticity. It is particularly preferable in order to obtain a composite molded product of high added value to employ a thermoplastic elastomer having a hardness (JIS Shore hardness: A scale) of from 35 to 70.

Examples of synthetic re in materials having higher hardnesses than that of the thermoplastic elastomer employed in the present invention are thermoplastic engineering plastics such as a polycarbonate, nylon 11, nylon 12, ABS resin and methacrylate resin and thermoplastic synthetic resins. It is preferable in order to obtain a composite molded product of high added value to select one from among the above-mentioned synthetic resin materials which has a hardness of 70 Shore A or more.

To carry out the process for rigidly bonding together by fusion bonding a molded part formed from a synthetic resin material having a relatively high hardness and a molded part formed from a thermoplastic composition of high rubber elasticity, either one of the following two processes may be adopted. Namely, a composition consisting essentially of a thermoplastic elastomer of high rubber elasticity and a polyether block amide is fusion-bonded to a molded piece which has previously been formed from a synthetic resin material having a relatively high hardness. Alternatively, the latter synthetic resin material is fusion-bonded to a molded piece which has previously been formed from the former thermoplastic elastomer composition.

In the process for producing a composite molded product according to the present invention, any technical means may be adopted to fusion-bond together a molded part that is formed from a synthetic resin material having a relatively high hardness and a molded part formed from a composition consisting essentially of a thermoplastic elastomer of high rubber elasticity and a polyether block amide. More specifically, it is possible to adopt any molding process in which fusion bonding conditions are set, for example, injection molding, extrusion molding, blow molding, calendering, compression molding, transfer molding, etc. Among them, injection molding process is preferable from the viewpoint of productivity.

The present invention will be described below in more detail by way of Examples. It should be noted that the present invention is in no way restricted to these Examples without departing from the gist of the invention.

EXAMPLE 1

The process of the present invention was applied to a process for producing water goggles comprising a goggle body and a contact member which comes into contact with the user's face, disclosed, for example, in Japanese Patent Post-Exam Publication No. 62-23577 (1987). The body portion of water goggles was formed from a polycarbonate by injection molding process. Then, a thermoplastic elastomer was fusion-bonded to the polycarbonate body portion of the water goggles through molding process by an injection molding means to form face contact portions of the goggles. The injection molding conditions were as follows: nozzle temperature, 220°C.; cylinder temperature, 180° C.; die bottom temperature, 140° C.; mold temperature, 50° C.; and injection pressure, 400 kg/cm².

More specifically, 100 parts by weight of S.E.B.S (hydrogenated SBS block copolymer, available from Mitsubishi Petro-Chemical Co., Ltd. under the registered tradename of "RABALON" T3427C) employed as a thermoplastic elastomer and 55 parts by weight of a polyether block amide (registered tradename "PEBAX" 6333SA00, SP value of 10.2 to 10.8, available from Toray Industries Inc.) were uniformly blended to obtain a polymer blend in which the two components were insularly dispersed.

Next, the polymer blend thus obtained was fusion-bonded to the previously molded polycarbonate body portion of water goggles by the above-mentioned injection molding process carried out under the injection conditions stated above. The polycarbonate and the polymer blend were strongly bonded together at the fusion bond area therebetween. The bond strength was the same as the tensile strength of the thermoplastic elastomer. In other words, the two molded parts of polycarbonate and S E B S were completely fusion-bonded together.

Under the same conditions as the above, two other experiments were conducted with regard to polymer blends respectively comprising 100 parts by weight of the thermoplastic elastomer and 25 parts by weight of the polyether block amide and 100 parts by weight of the former component and 185 parts by weight of the latter component. These two polymer blends were also completely fusion-bonded to the polycarbonate body portion of water goggles.

EXAMPLE 2

An injection molding process was carried out in the same way as in Example 1 except that TPO (thermoplastic olefin elastomer, available from Mitsui Petrochemical Industries, Ltd. under the registered tradename of "Milastomer" 5030N) was used in place of S.E.B.S. In this case also, the surfaces of the polycarbonate molded part and the polymer blend molded part were completely fusion-bonded together.

EXAMPLE 3

An injection molding process was carried out in the same way as in Example 1 except that styrene-butadienestyrene-styrene (SBS, available from ARON KASEI Co., Ltd. under the tradename of "ELASTOMER AR" AR140) was used in place of S.E.B.S. In this case also, the surfaces of the polycarbonate molded part and the polymer blend molded part were completely fusion-bonded together.

EXAMPLE 4

An injection molding process was carried out in the same way as in Example 1 except that a thermoplastic elastomer (available from ARON KASEI Co., Ltd. under the tradename of "ARON AR" 740BK) was used in place of S.E.B.S. In this case also, the surfaces of the polycarbonate molded part and the polymer blend molded part were completely fusion-bonded together.

EXAMPLE 5

An injection molding process was carried out in the same way as in Example 1 except that an ABS resin (acrylonitrile-butadiene-styrene resin, available from Electro Chemical Industry Co., Ltd under the tradename of "DENKA ABS" GR-1000) was used in place of polycarbonate. In this case also, the surfaces of the ABS resin molded part and the polymer blend molded part were completely fusion-bonded together with a satisfactorily high bond strength.

EXAMPLE 6

An injection molding process was carried out in the same way as in Example 1 except that a methacrylate resin (available from Mitsubishi Rayon Company Limited under the tradename of "ACRYLPET") was used in place of polycarbonate. In this case also, the surfaces of the methacrylate resin molded part and the polymer blend molded part were completely fusion-bonded together with a satisfactorily high bond strength.

EXAMPLE 7

The process for producing a composite molded product according to the present invention was applied to a process for molding a mechanical part such as that disclosed in Japanese. Patent Application Laid-Open Publication (KOKAI) No. 57-144737 (1982) In place of the polycarbonate molded piece in Example 1, a mechanical part previously molded out of nylon 11 was placed in the mold. The same polymer blend that employed in Example 1 was fusion-bonded to the molded mechanical part through injection molding process under the same conditions as in Example 1. The surfaces of the molded mechanical part and the polymer blend molded part were completely fusion-bonded together.

EXAMPLE 8

An injection molding process was carried out in the same way as in Example 7 except that nylon 12 was used in place of nylon 11. In the case also, the surfaces of the molded mechanical part and the polymer blend molded part were completely fusion-bonded together.

Thus, the process according to the present invention enables a thermoplastic engineering plastic material and a thermoplastic elastomer to be strongly fusion-bonded together by an efficient fusion bonding means.

In particular, a thermoplastic elastomer which is soft and has high rubber elasticity, such as hydrogenated SBS block copolymer, can be strongly fusion-bonded to an engineering plastic material having a relatively high hardness, such as a polycarbonate, by fusion bonding, which is a simple and easy means. Therefore, it is possible to provide effectively and efficiently composite molded products having novel performance and functions.

What is claimed is:

1. A process for producing a composite molded product by fusion-bonding a thermoplastic elastomer composition to a molded piece which has previously been formed from a synthetic resin material and which has a higher hardness (JIS Shore hardness: A scale) than that of a molded piece formed from said thermoplastic elastomer composition, or by fusion-bonding a synthetic resin material to a molded piece which has previously been formed from a thermoplastic elastomer composition and which has a lower hardness than that of a molded piece formed from said synthetic resin material, wherein said thermoplastic elastomer composition comprises:

(i) 100 parts by weight of a thermoplastic elastomer; and (ii) 25 to 185 parts by weight of a polyether block amide.

2. A process for producing a composite molded product according to claim 1, wherein said thermoplastic elastomer has a hardness of from 35 to 70 Shore A.

3. A process for producing a composite molded product according to claim 1, wherein said thermoplastic elastomer is one selected from among hydrogenated SBS block copolymer, olefin elastomer, diene elastomer, urethane elastomer and plasticized polyvinyl chloride.

4. A process for producing a composite molded product according to claim 1, wherein the hardness of the synthetic resin material that provides a molded piece having a higher hardness than that of a molded piece formed from the thermoplastic elastomer composition is not lower than 70 shore A.

5. A process for producing a composite molded product according to claim 1, wherein the synthetic resin material that provides a molded piece having a higher hardness than that of a molded piece formed from the thermoplastic elastomer composition is one selected from among a polycarbonate, nylon 11, nylon 12, ABS resin and methacrylate resin.

6. A process for producing a composite molded product according to claim 1, wherein said fusion bonding is effected by means of injection molding.

* * * * *